Dec. 23, 1952     W. KOMASA     2,623,159
GLARE REDUCING LENS FOR HEADLIGHTS
Filed Dec. 30, 1948
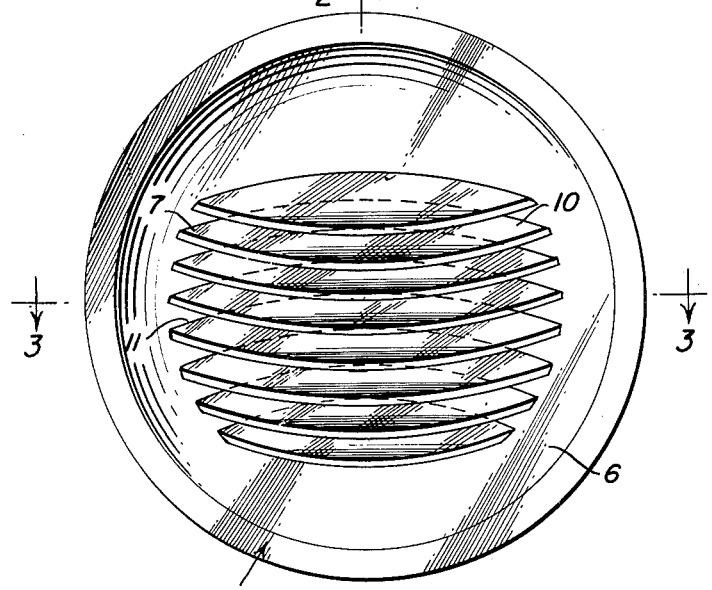
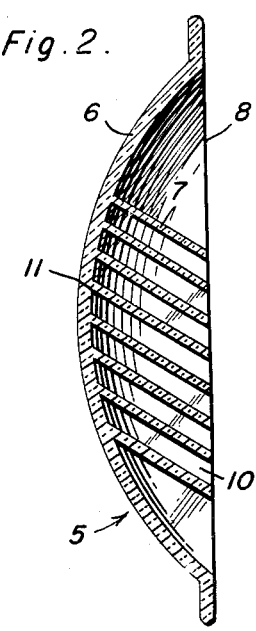
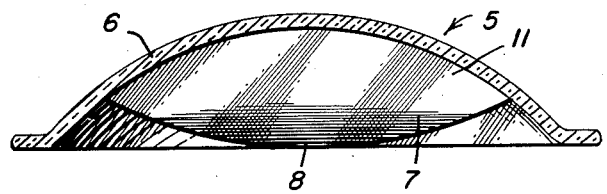
Walter Komasa
INVENTOR.

Patented Dec. 23, 1952

2,623,159

UNITED STATES PATENT OFFICE 2,623,159

GLARE REDUCING LENS FOR HEADLIGHTS

Walter Komasa, South Bend, Ind.

Application December 30, 1948, Serial No. 68,158

1 Claim. (Cl. 240—46.33)

This invention relates to lenses for headlights or spot lights of automobiles, to searchlights, or to the lights of locomotives and to similar lights in which a beam is concentrated and is projected at a distance for the illumination of localities, such as roads and tracks which are used by other persons who may be inconvenienced or endangered by the blinding glare of the beam.

It is an object of the invention to provide means whereby the blinding and dazzling glare of the projected beam will be dimmed or attenuated to such an extent that a practically glareless illumination results, without however impairing the usable intensity of the illumination.

It is a further object of the invention to provide a lens for headlights, searchlights, spot lights or similar lights which may be mounted in the same way in which the customary lenses are mounted, but which will nevertheless and without any additional or auxiliary structure cut down the glare of the illumination caused by the beam projected through the lens.

With these and other objects in view the invention consists in a glare reducing lens, such as a convex lens which is provided with a number of thin, spaced, parallel leaves projecting from the body of the lens from the inner sides thereof which faces the source of light, said projecting leaves being inclined towards the horizontal plane passing through the optical axis of the lens.

A further feature of the invention consists in arranging the thin, spaced, parallel and inclined leaves projecting from the lens body in such a way that the lines of intersection between said leaves and the lens body are contained or enclosed within a circle drawn around the optical axis of the lens, the said circle being of a diameter which is smaller than the diameter of the lens. These leaves may be circular segments of a varying width and are preferably inclined at an angle of approximately 35° towards the optical axis of the lens.

A further object of the invention and further features of the same will be apparent from the following detailed specification.

The invention is illustrated in the accompanying drawings showing one embodiment of the same. It is however to be understood that this embodiment is merely shown by way of example for the purpose of illustrating the principle of the invention and the best mode of applying said principle. As will be clear to the expert skilled in this art the principle of the invention may be applied in a modified way and modifications of the example shown are not necessarily departures from the essence of the invention.

In the drawings:

Figure 1 is a rear view of the glare suppressing or reducing lens;

Figure 2 is a sectional elevational view of the lens, the section being taken along the vertical plane of symmetry 2—2;

Figure 3 is a sectional plan view of the lens, the section being taken along the plane 3—3 of Figure 1.

As above stated, the main problem arising in connection with headlights of automotive vehicles in providing a full and highly efficient illumination of the objects in front of said vehicles at as great a distance as possible, such illumination being obtained by using directed beams concentrating the rays of an intense source of light and in reducing or suppressing at the same time the blinding glare resulting from such illumination which inconveniences and endangers persons which have to look in the direction of the beam.

The above described difficulty is effectively eliminated or materially reduced by the lens construction for automotive vehicles according to the invention which permits the passage of the rays of the beam of light with only slight losses in one direction, while preventing the concentration and the formation of a glare emitting image of the source of light when looking along the beam in the other direction.

This result is obtained by means of a convex lens provided with a number of thin, parallel glass leaves having the shape of curved segments which are projecting from the body of the lens on the side facing the source of light and which are downwardly inclined at an appropriate angle with respect to the optical axis of the lens which, in the case of a vehicle, is coincident with the horizontal. The rays emanating from the source of light may penetrate through said leaves or are reflected between the leaves and are passed out through the channels formed by adjacent leaves after repeated reflections. When looking along the beam towards the source of light the latter does therefore not produce any glare as the leaves which are interposed between the source of light and points outside the lens prevent the formation of a concentrated image of the source of light when viewed from a point outside.

The effective prevention of a blinding glare is partly due to a partial polarization of the light emanating from the lens and partly to the fact that the leaves are so arranged that a number of them are penetrated by a ray before emanating from the lens. Thus a field of illumination is produced which does not admit the reflection of the incandescent portion of the source of light and which also eliminates the running spot glare or "hot spot" which is always seen when looking at a reflector.

The interposition of the leaves, while somewhat decreasing the illumination in a given direction, passing through the focal point of the reflector, does not interfere to a marked degree with the sum total of the illumination proceeding from the lens towards an object.

On account of the improvement in the glare reduction obtained by the type of lens described, electric bulbs or other sources of light of higher candle power may be used in order to intensify the illumination of a given spot and to increase the distance to which the beam reaches.

In the example shown the lens which is generally indicated at 5 is arranged in front of a lamp and reflector structure (not shown) from which a light beam in substantial parallelism to the axis of the lens system emanates.

The lens comprises a lens body 6 which may be of any appropriate curvature and shape but which is shown in the figure as a substantially spherical lens with parallel outer and inner surfaces of substantially the same curvature.

A number of leaves 7 project from the inner side of the lens body 6. These leaves have the form of curved segments or circle segments as seen in Figures 1 and 3 and they are located in planes inclined at an angle of approximately 35° towards the optical axis of the system which, in the case of a vehicle, is coincident with the horizontal.

A number of spaced parallel leaves are arranged in planes intersecting the spherical lens body 6, the lines of intersection being enveloped and contained within a circle surrounding the optical axis which is however smaller than the diameter of the lens opening. The maximal width of the leaves may gradually increase towards the center of the lens and may then gradually decrease so that the end points which are farthest from the body of the lens are all located on a line 8 as clearly seen in Figure 2.

The leaves are relatively thin so that they can easily be penetrated by the rays of the source of light. The distance between the leaves is so selected that the ray which is parallel to the optical axis of the lens and which passes within the circle defined by the lines of intersection between the leaves and the lens body and which enters a channel 10 between two leaves must always pass at least through one leaf projecting from the lens body, if not deflected.

As the gap between the leaves in the central portion 11 of the lens body where the maximal glare occurs is small the light is spread over the circle enclosing the leaves and no dazzling reflection of the source of light is observed which is likely to blind persons looking along the beam.

The lens may be used for headlights or spot lights of cars, for searchlights, for locomotive and signal lights and for similar lights provided with a strong and intense light source the beams of which are concentrated by a reflector or lens system which lights have to be used in places in which a strong illumination is desirable, but in which blinding effects on other users of the same places have to be avoided.

It will be clear that changes in the shape and in other unessential details may be made without affecting the essence of the invention.

Having described the invention, what is claimed as new is:

A glare reducing lens for headlights comprising a transparent convex lens body having the shape of a segment of a body of rotation curving away from a planar base in the plane of intersection separating the segment from the remainder of the body of rotation, a number of thin transparent parallel planar leaves having the shape of circular segments projecting from the concave side of the lens body turned towards the source of light and contained within the space encircled and surrounded by the convex lens body and the planar base in the aforesaid plane of intersection, said leaves being integral with the lens body and projecting from a central circular section of the lens body surrounding the optical axis of the same, which is smaller than the diameter of the lens body, and said leaves being parallel and inclined towards the optical axis of the lens at an angle of approximately 35°, each leaf projecting from the concave side of the lens body to such an extent that at one point its curved peripheral portion reaches and is tangential to the aforesaid plane of intersection in the planar base of the lens, the leaves being so spaced that rays passing through the central section of the lens pass through a plurality of leaves, the light emitted on the convex side of the lens body being approximately equal to the light entering the leaves at the concave side of the lens, the glare in the central zone being thus eliminated.

WALTER KOMASA.

REFERENCES CITED

The following references are of record in the file of this patent:

UNITED STATES PATENTS

| Number | Name | Date |
|---|---|---|
| 1,580,373 | Hixon | Apr. 13, 1926 |
| 2,270,535 | Land et al. | Jan. 20, 1942 |
| 2,370,084 | Smith | Feb. 20, 1945 |

FOREIGN PATENTS

| Number | Country | Date |
|---|---|---|
| 3,612 | Australia | Mar. 18, 1932 |
| 397,891 | Great Britain | Sept. 1, 1933 |